US007519288B2

(12) United States Patent
Kim

(10) Patent No.: US 7,519,288 B2

(45) Date of Patent: Apr. 14, 2009

(54) STROBE DEVICE FOR CAMERA

(75) Inventor: Myung-gyu Kim, Changwon-si (KR)

(73) Assignee: Samsung Digital Imaging Co., Ltd. (KR)

( * ) Notice: Subject to any disclaimer, the term of this patent is extended or adjusted under 35 U.S.C. 154(b) by 632 days.

(21) Appl. No.: 11/158,850

(22) Filed: Jun. 22, 2005

(65) Prior Publication Data

US 2006/0153559 A1 Jul. 13, 2006

(30) Foreign Application Priority Data

Jan. 12, 2005 (KR) ...................... 10-2005-0002934

(51) Int. Cl.
*G03B 15/03* (2006.01)

(52) U.S. Cl. ....................... 396/177; 396/178; 396/429; 348/370; 348/371

(58) Field of Classification Search ................. 396/177, 396/178, 429; 348/132, 371, 370; D16/209, D16/737, 739, 237, 239, 240
See application file for complete search history.

(56) References Cited

U.S. PATENT DOCUMENTS

| | | | | |
|---|---|---|---|---|
| 4,920,368 | A * | 4/1990 | Arai et al. | 396/177 |
| 5,329,327 | A * | 7/1994 | Arai et al. | 396/177 |
| D351,179 | S * | 10/1994 | Schappler | D16/209 |
| 6,510,286 | B1 * | 1/2003 | Terada et al. | 396/177 |
| 2004/0071459 | A1 * | 4/2004 | Ujikane et al. | 396/178 |

FOREIGN PATENT DOCUMENTS

| | | |
|---|---|---|
| JP | 2004-151684 | 5/2004 |

* cited by examiner

*Primary Examiner*—W. B. Perkey
*Assistant Examiner*—Warren K Fenwick
(74) *Attorney, Agent, or Firm*—Park & Associates IP Law LLC

(57) ABSTRACT

A strobe pop-up device for moving a strobe assembly to pop-up, bounce, and closed positions includes: a strobe assembly having a strobe, and a strobe connecting link, a bottom end of which is rotatably supported by a main body of the camera to move the strobe assembly to the pop-up, bounce, or closed position; an elastic element that is located at a point where the strobe connecting link is connected to the main body of the camera, and biases the strobe assembly toward a direction the strobe assembly stands upright; and a bounce-position maintaining element which fixes the strobe assembly to be in an inclined position at a predetermined angle between the closed position and the pop-up position. The point where the main body of the camera is connected to the strobe connecting link is disposed closer to a subject to be photographed than the strobe when in the closed position.

18 Claims, 12 Drawing Sheets

100
103
42
102
15
10
70
104
101

44
41
46
48
54
51
52
53
42
45
81
22a
27
47
22d
81
22d
22a
27
24
22'
22c
22
22c
60
22b
22b
31
12
24
33
50
77
77a
30
76
12
75
76
12

STROBE DEVICE FOR CAMERA

RELATED PATENT APPLICATION

This application claims priority of Korean Patent Application No. 10-2005-0002934, filed on Jan. 12, 2005 in the Korean Intellectual Property Office, the disclosure of which is incorporated herein in its entirety by reference.

BACKGROUND OF THE INVENTION

1. Field of the Invention

The present invention relates to a strobe device and a camera having the strobe device, and more particularly, to a strobe pop-up device of a camera that can lock a strobe assembly within a camera, or move the strobe assembly to a pop-up and/or a bounce position.

2. Description of the Related Art

A camera often includes a strobe device built in a camera body, which can be popped up by pressing a button. Such a strobe pop-up device typically includes a pressure spring biasing the strobe to a pop-up location, and a fixing lever operable by a motor. The strobe is held within the camera by the fixing lever which is subject to an elastic force of the pressure spring. When a user releases the fixing lever by pressing the button, the strobe springs up to the pop-up location by the elastic force of the pressure spring.

Such a conventional pop-up device requires a gear train having of a plurality of gears for transmitting a driving force of motor to the fixing lever in order to move the fixing lever between a fixing location and a release location using the driving force of the motor. As a result, a large space is required to accommodate the gear train, which hinders miniaturization of the camera. In addition, use of the fixing lever increases the number of components for the strobe pop-up device, thereby increasing the manufacturing cost of the camera. Furthermore, such a strobe cannot be fixed in an intermediate position (so-called a bounce position) to illuminate the flashing light toward the ceiling for obtaining indirect lighting with the strobe.

SUMMARY OF THE INVENTION

The present invention provides a strobe device that can easily move a strobe assembly to a pop-up position, an intermediate position (i.e., bounce position), and a closed position without using a motor or a gear train, and a camera having the strobe device. According to the invention, the number of components of the strobe pop-up device of a camera cab be reduced, thereby providing a light and miniaturized pop-up device of a camera at a low cost.

According to one aspect of the present invention, there is provided a strobe pop-up device having: a strobe assembly including: a strobe and a strobe connecting link, a bottom end of which is rotatably supported by a main body of a camera to move the strobe assembly to a closed position, a pop-up position, and/or a bounce position; an elastic element that is located at a point where the strobe connecting link is connected to the main body of the camera, and biases the strobe assembly toward a direction the strobe assembly stands upright; and a bounce-position maintaining element which fixes the strobe assembly to be in an inclined position at a predetermined angle between the closed position and the pop-up position. The point where the main body of the camera is connected to the strobe connecting link, at which the elastic element is located, is disposed closer to a subject to be photographed than the strobe when in the closed position.

The strobe assembly preferably accommodates the strobe, and the strobe pop-up device may further have a strobe case that is connected to the strobe connecting link.

The elastic element may be a pop-up spring in form of a coil spring that is located at the point where the strobe connecting link is connected to the main body of the camera, one end of the pop-up spring is supported by the strobe case, and the other end of the pop-up spring is supported by the main body of the camera.

The strobe pop-up device may further have a hook that fixes the strobe assembly in the closed position.

The strobe pop-up device may further have a strobe locking unit that maintains the strobe assembly in the closed position by controlling the location of the hook or releases the strobe assembly from the closed position in response to the elastic force of the pop-up spring.

The strobe locking unit may have a solenoid coil of which one side is fixed to the main body of the camera and the other side is a movable portion that moves in response to a magnetic field produced when current flows through the solenoid coil; a hook connecting link that is connected to the movable portion via a pin joint; a movable plate that moves the hook according to the movement of an end of the hook connecting link; and a strobe lock lever spring that is connected to the movable plate, and biases the hook in the closed position.

The movable plate has a through-hole having a predetermined length formed thereon, and the movable plate may be supported by a pin joint, which passes through the through-hole, to be able to move with a predetermined clearance from the main body of the camera.

The movable portion has a through-hole having a predetermined length formed thereon, and the hook connecting link may be supported by a pin joint, which passes through the through-hole, to be able to move with a predetermined clearance.

The bounce-position maintaining element may have: a guide link which is rotatably connected to the strobe connecting link; and a bounce lock lever of which one end is rotatably connected to an end of the strobe connecting link and the other end is connected to the guide link via a bounce lock spring, which applies an elastic force towards the guide link and is coupled to a bounce lock pin.

A guide slot is formed in the guide link, and the strobe pop-up device may further have a strobe guide lever, one side of which is fixed to the main body of the camera and can move along the guide slot.

The strobe pop-up device may further have a guide spring which applies an elastic force upwards to maintain the bounce lock pin in the bounce lock pin groove even when the strobe guide lever moves toward the outside along the guide slot.

According to another aspect of the present invention, there is provided a camera having: a main body having a barrel, a view finder, and operating buttons formed on an outer surface thereof; a strobe assembly including: a strobe and a strobe connecting link which has its lower portion rotatably supported by the main body, and moves the strobe assembly to a closed position, a pop-up position, or a bounce position; an elastic element which is disposed at a point where the strobe connecting link is connected to the main body, and biases the strobe assembly toward a direction the strobe assembly stands upright; and a bounce-position maintaining element which fixes the strobe assembly to be in an inclined position at a predetermined angle between the closed position and the pop-up position. The point where the main body of the camera is connected the strobe connecting link, at which the elastic element is located, is disposed closer to a subject to be photographed than the strobe when in the closed position.

The strobe assembly may accommodate the strobe, and further have a strobe case that is connected to the strobe connecting link, and the elastic element is a pop-up spring in a form of a coil spring that is located at the point where the strobe connecting link is connected to the main body of the camera, one end of the pop-up spring is supported by the strobe case, and the other end of the pop-up spring is supported by the main body of the camera.

The bounce-position maintaining element may have: a guide link which is rotatably connected to the strobe connecting link; and a bounce lock lever of which one end is rotatably connected to an end of the strobe connecting link and the other end is connected to the guide link via a bounce lock spring, which applies an elastic force towards the guide link and is coupled to a bounce lock pin.

A guide slot is formed in the guide link, and the strobe pop-up device may further have a strobe guide lever, one side of which is fixed to the main body of the camera and can move along the guide slot.

The camera may further have a guide spring which applies an elastic force upwards to maintain the bounce lock pin in the bounce lock pin groove even when the strobe guide lever moves toward the outside along the guide slot.

BRIEF DESCRIPTION OF DRAWINGS

The above and other features and advantages of the present invention will become more apparent by describing in detail exemplary embodiments thereof with reference to the attached drawings in which.

DETAILED DESCRIPTION OF PREFERRED EMBODIMENTS

The present invention will now be described more fully with reference to the accompanying drawings, in which exemplary embodiments of the invention are shown.

Figure 1:
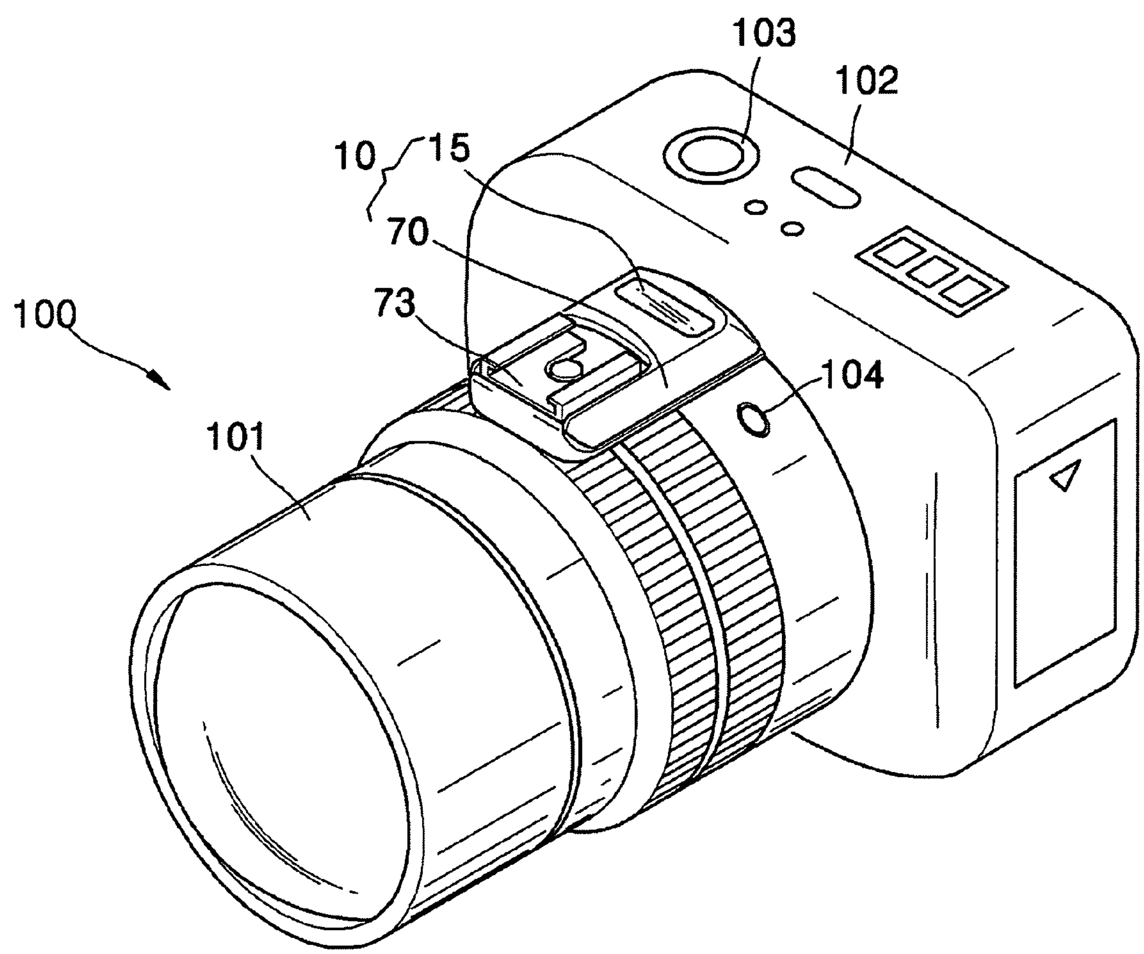
FIG. 1 is a perspective view of a camera according to an embodiment of the present invention.
Figure 2:
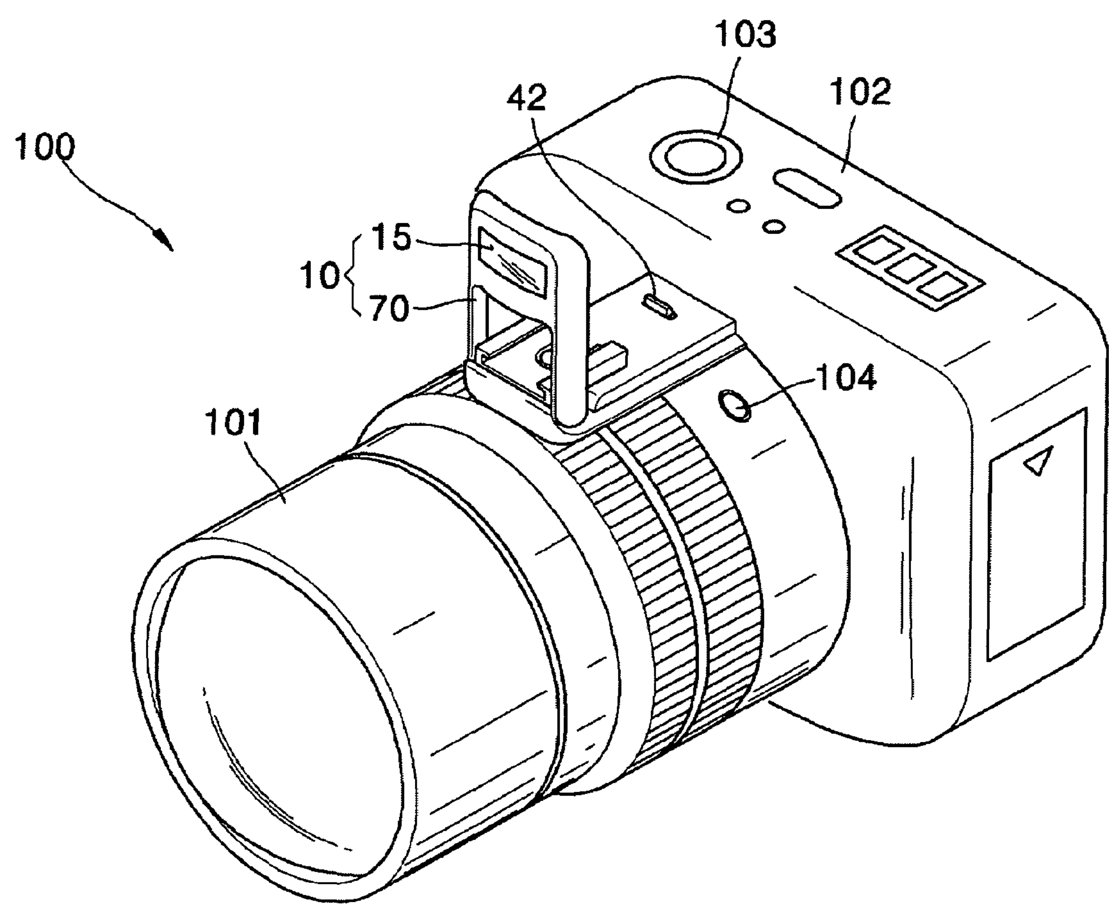
FIG. 2 is a perspective view of the camera in FIG. 1 in which a strobe assembly is in a pop-up position.

FIG. 1 is a perspective view of a camera 100 according to one embodiment of the present invention, and FIG. 2 is a perspective view of the camera 100 in which a strobe assembly 10 is in a pop-up position.

Referring to FIGS. 1 and 2, the camera 100 includes a main body 102, a barrel 101, a plurality of operating buttons, and strobe assembly 10.

The main body 102 and the barrel 101 have the same or similar structure and function as those of the conventional art, and their detailed descriptions are omitted herein. Operating buttons include a shutter button 103 and a strobe pop-up button 104. The shutter button 103 is used to photograph an image using the camera 100, and the strobe pop-up button 104 is used to manually pop-up the strobe assembly 10.

The strobe assembly 10 includes a strobe 15 and a strobe case 70 which accommodates the strobe 15. The strobe assembly 10 is initially in a closed position as illustrated in FIG. 1, and can be raised to a pop-up position as illustrated in FIG. 2 when needed, to illuminate an object in front of the camera 100. Although not illustrated in FIGS. 1 and 2, the strobe 15 can be fixed and maintained in an intermediate position (so-called a bounce position) that is inclined at about 45° to the axis of the barrel 101 to provide indirect lighting of the object.

The strobe pop-up button 104 transmits a signal for moving the strobe assembly 10 to the pop-up position (illustrated in FIG. 2) or the intermediate or bounce position, when using the strobe as there is insufficient natural light to take a photograph. The strobe assembly 10 can be configured to pop-up manually when the user presses the strobe pop-up button 104, or otherwise to pop-up automatically according to a signal output generated from a light sensor (not shown) when there is insufficient light to take a picture with the camera.

A shoe holder 73 can optionally be provided on the strobe assembly 10 or the camera main body 102 to mount a separate lighting element thereon besides the strobe 15. In the present embodiment, the strobe 15 is disposed on an upper portion of the strobe case or housing 70, and a suitably dimensioned cavity or opening corresponding to the size of the shoe holder 73 is formed on a lower or frontal portion of the strobe case 70 so that the strobe case 70 and the shoe holder 73 do not interfere with each other. The strobe case 70 has a strobe connecting link 13 in it. Both the strobe case 70 and the strobe connecting link 13 are in a generally "n" or reversed-U shape. Preferably, both ends of the strobe connecting link 13 are rotatably supported at two points of the main body 102.

A hinge at which the strobe connecting link 13 is connected to the camera 100 is disposed at a front location of the strobe 15 as the strobe 15 is in the closed position, as illustrated in FIG. 1. Adopting a strobe pop-up device according to the present embodiment, the strobe 15 can be popped up 90° about the hinge to assume the pop-up position and face to the front, or 45° into an intermediate or bounce position. The bounce position will be described later in more detail with reference to FIGS. 5 through 8.

A predetermined through-hole (not shown) is formed at a rear area of the strobe case 70. The main body 102 may further include a hook 42 which holds the strobe case 70 at the main body 102 through the through-hole. A spring (not shown) may be further installed at a point where the strobe assembly 10 is supported by the main body 102. The spring forces the strobe assembly 10 in an upright direction with respect to the barrel 101. The shutter button 103 can operate to release the strobe assembly 10 in the upright direction using the elastic force of the spring and controlling the movement of the hook 42 while the strobe case 70 is fixed through the through-hole formed at the rear portion of the strobe case 70.

The structure and operation of the strobe pop-up device is described herein in further details in which the strobe assembly 10 of the camera 100 moves from the closed position to the pop-up position or the bounce position.

Figure 3:
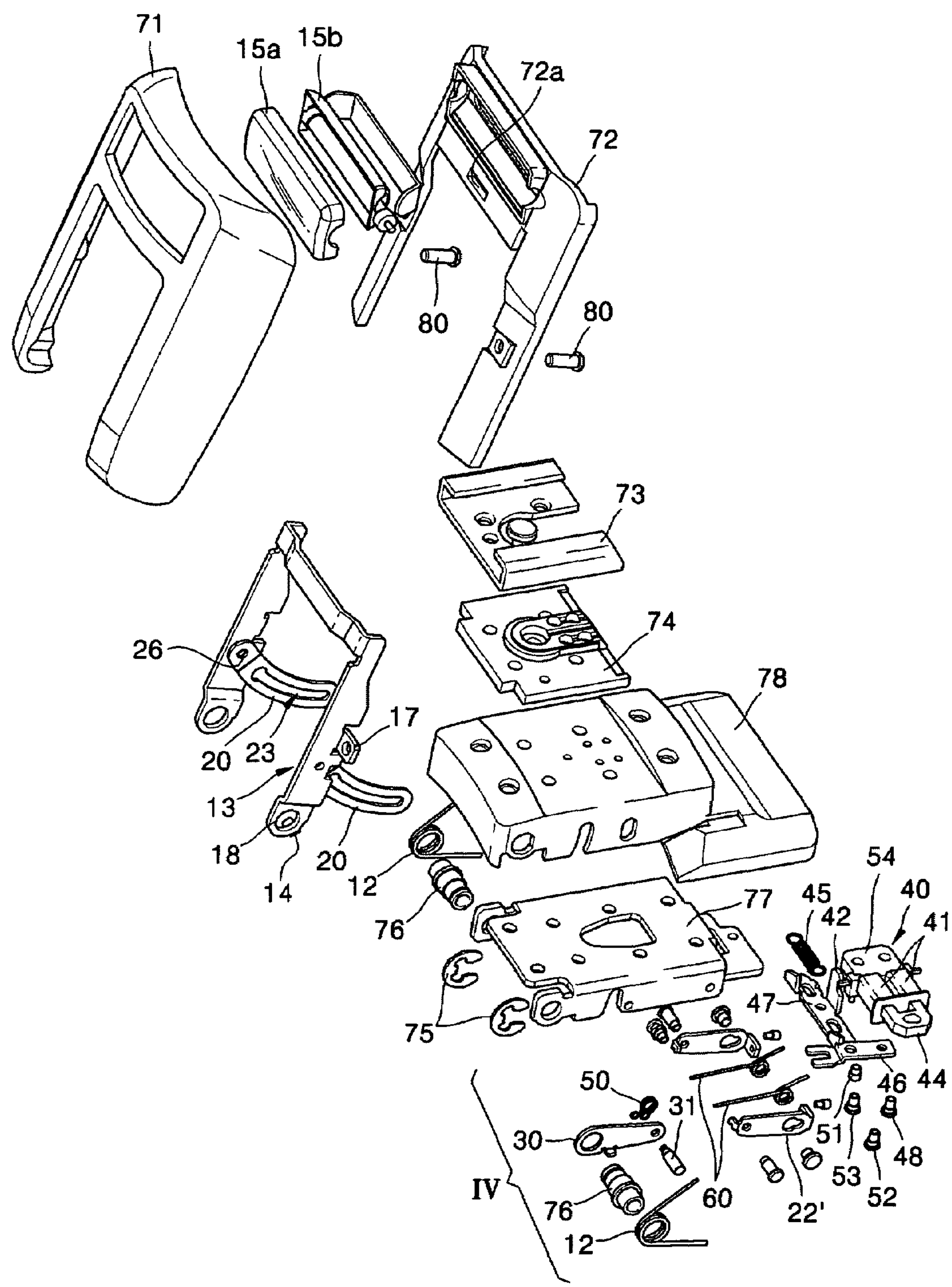
FIG. 3 is an exploded perspective view of a strobe pop-up device of FIG. 1.
Figure 4:
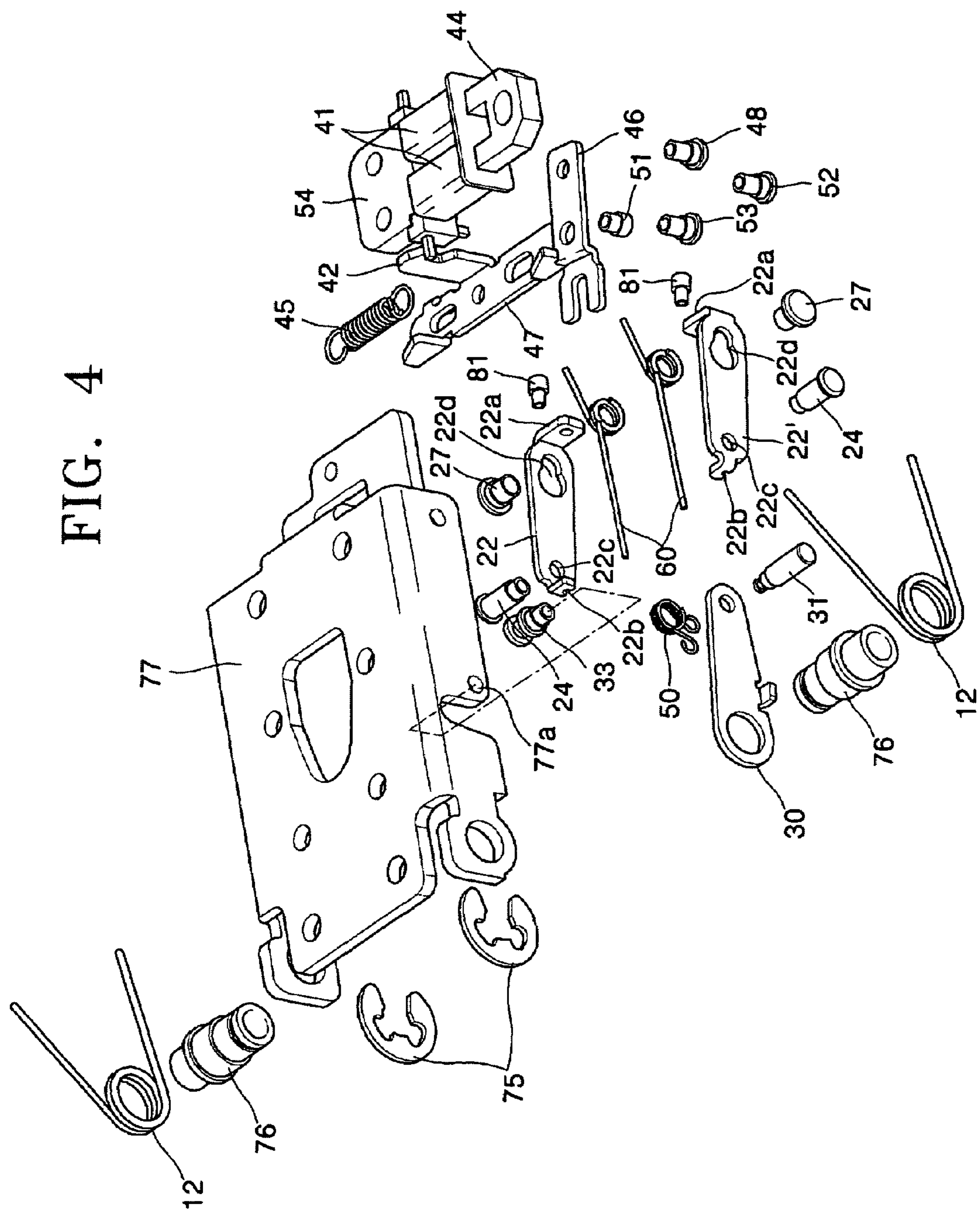
FIG. 4 is an enlarged view of a portion IV of FIG. 3.

FIG. 3 is an exploded perspective view of the strobe pop-up device, and FIG. 4 is an enlarged view of a portion IV of FIG. 3. The construction and structure of the components illustrated in FIGS. 3 and 4 are exemplary and are used only to describe the general structure or function of the strobe pop-up device of the present invention. Thus, the present invention is not limited to the contents illustrated in FIGS. 3 and 4.

As illustrated in FIG. 3, the strobe 15 includes Fresnel lens 15*a* disposed at its front portion, and a reflector 15*b* at its rear portion. As described above, the strobe 15 is accommodated in the strobe case 70, which includes a strobe front cover 71 and a strobe back cover 72. The strobe connecting link 13 is disposed between the strobe front cover 71 and the strobe back cover 72, and allows the strobe 15, the strobe front cover 71, and the strobe back cover 72 to move unitarily.

The strobe connecting link 13 includes connecting flanges 17 which couple the strobe front cover 71 and the strobe back cover 72 via screws 80. Guide links 20 are rotatably coupled to the strobe connecting link 13 via pin joints 26.

Referring to FIGS. 3 and 4, a bounce lock lever 30, a first shoe base 77, and a second shoe base 78 are rotatably coupled to the bottom portion of the strobe connecting link 13 via bushings 76, which are pivot shafts. The strobe connecting link 13 is biased toward the pop-up position by pop-up springs 12 coupled to the bushings 76 from the first and second shoe bases 77 and 78, which are fixed to the main body 102.

The pop-up springs 12 may be a coil spring, as illustrated in FIGS. 3 and 4, having both ends thereof extended outwardly. Here, both ends of the pop-up springs 12 are supported by a portion 71*c* (see FIG. 5) of the strobe front cover 71 and a portion 77*b* (see FIG. 5) of the first shoe base 77, thereby biasing the strobe assembly 10 toward the pop-up position.

In addition, E-rings 75 are coupled to both ends of the bushings 76 to couple the bushings 76 to the first and second shoe bases 77 and 78. A shoe plate 74 and the shoe holder 73 are sequentially disposed on top of the second shoe base 78.

As shown in FIGS. 3 and 4, a strobe locking unit 40 is installed below the first and second shoe bases 77 and 78. The strobe locking unit 40 locks the strobe assembly 10 in the closed position and releases the strobe assembly 10 so that the strobe assembly 10 can move to the pop-up position or the bounce position.

The strobe locking unit 40 includes a solenoid coil 41, a hook 42, a strobe lock lever spring 45, and a hook connecting link 46. The hook 42 is coupled to a through-hole 72*a* formed in the strobe back cover 72 via through-holes formed in the first and second shoe bases 77 and 78, thereby locking the strobe assembly 10 in the closed position. Operation and the components of the strobe locking unit 40 will be described later in more detail.

One end of each pair of strobe guide levers 22 is fixed by a screw 81 inside the first shoe base 77. The other end of each of the strobe guide levers 22 is coupled to one of the guide links 20 by strobe link pins 24 in a manner moveable along guide slots 23 formed in the guide links 20.

Guide springs 60 are formed on the strobe guide levers 22. The guide springs 60 are coupled to the strobe guide levers 22 by spring fixing pins 27, and the guide springs 60 always bias the strobe guide levers 22 toward the pop-up position. The guide springs 60 can prevent the strobe guide lever 22 from sliding down along the guide slot 23 when the strobe assembly 10 is in the pop-up position or the bounce position, and thus prevents the release of a bounce lock pin 31.

A bounce lock pin groove 25 (see FIG. 5) is formed in the guide link 20, and the bounce lock pin 31 is coupled to the bounce lock lever 30. In the bounce position, which will be described later, the bounce lock pin 31 is locked into the bounce lock pin groove 25 to maintain the strobe assembly 10 in the bounce position. One end of a bounce lock spring 50 is coupled to the bounce lock pin 31. The other end of the bounce lock spring 50 is fixed to a spring fixing protrusion 33 (see FIG. 6) that is coupled to the first shoe base 77, which is coupled to the main body 102, and biases the bounce lock pin 31 toward the bounce lock pin groove 25, thereby maintaining the strobe assembly 10 in the bounce position. The spring fixing protrusion 33 is coupled to the first shoe base 77 inside the first shoe base 77 and protrudes outwards via a through-hole 77*a* formed in the first shoe base 77.

Operation of the strobe pop-up device will be described in more detail below. The main body 102 and the strobe case 70 are not shown in FIGS. 5 through 13 for simplicity purposes and in order to better illustrate interconnection structure of the strobe pop-up device.

Figure 5:
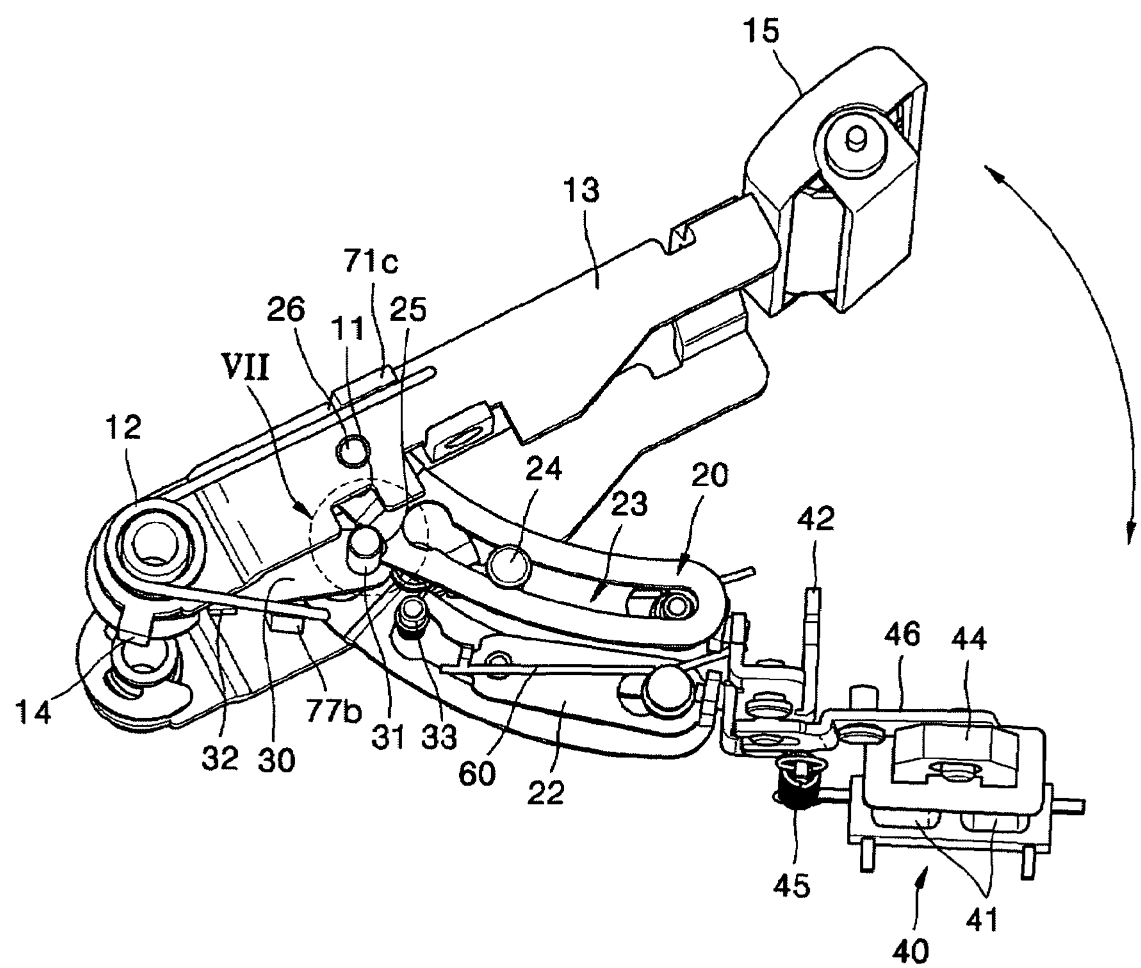
FIGS. 5 and 6 are perspective views of the strobe pop-up device of the invention in a bounce position.
Figure 6:
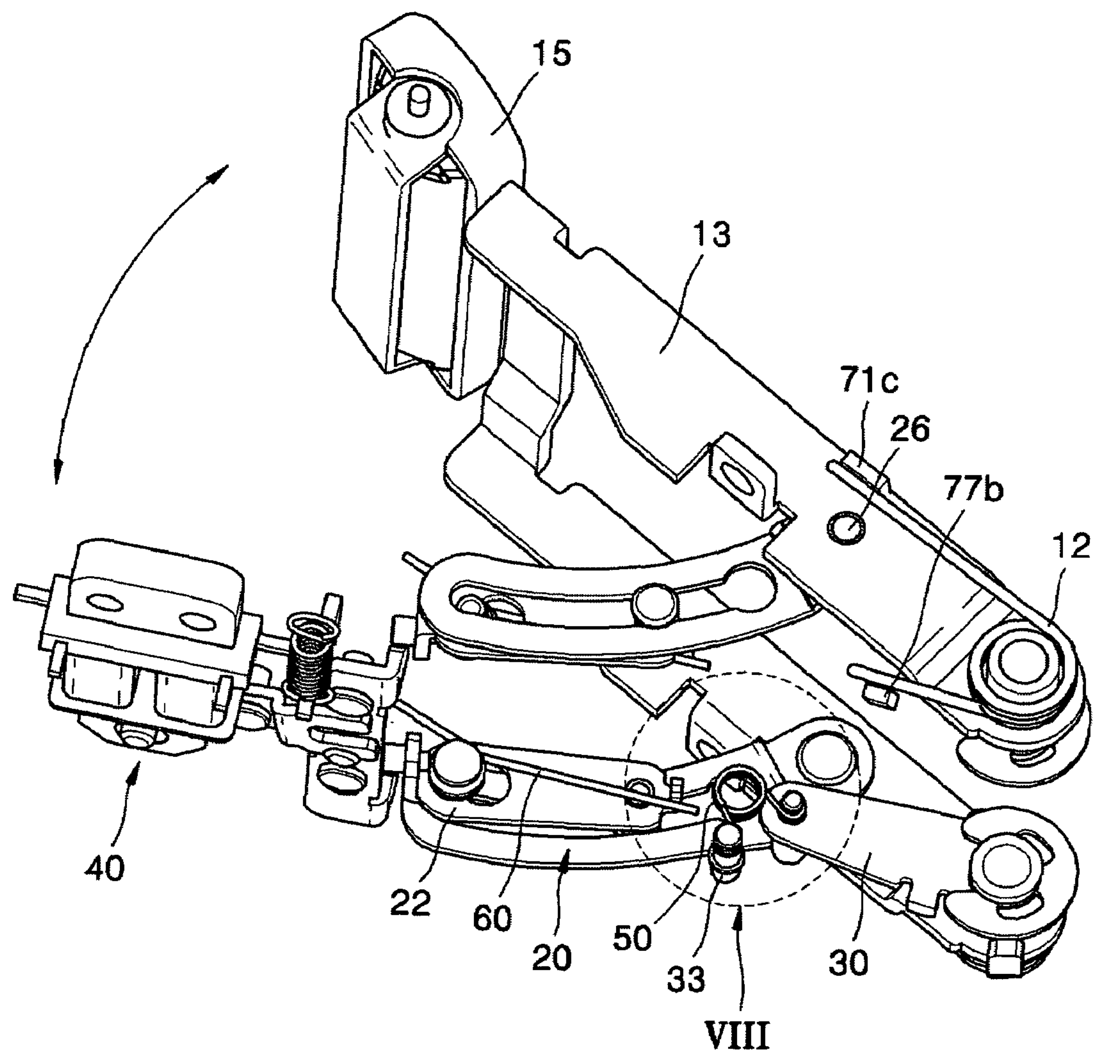
Figure 7:
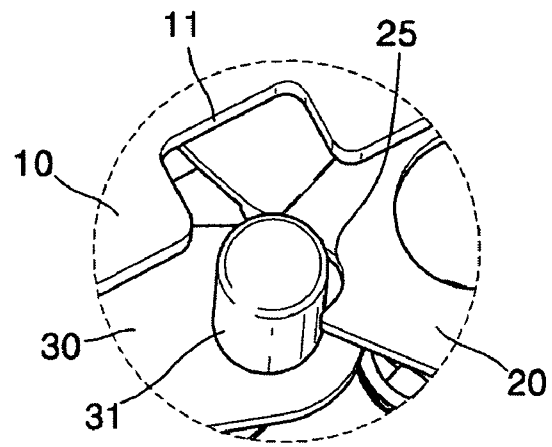
FIG. 7 is an enlarged view of a portion VII of FIG. 5.
Figure 8:
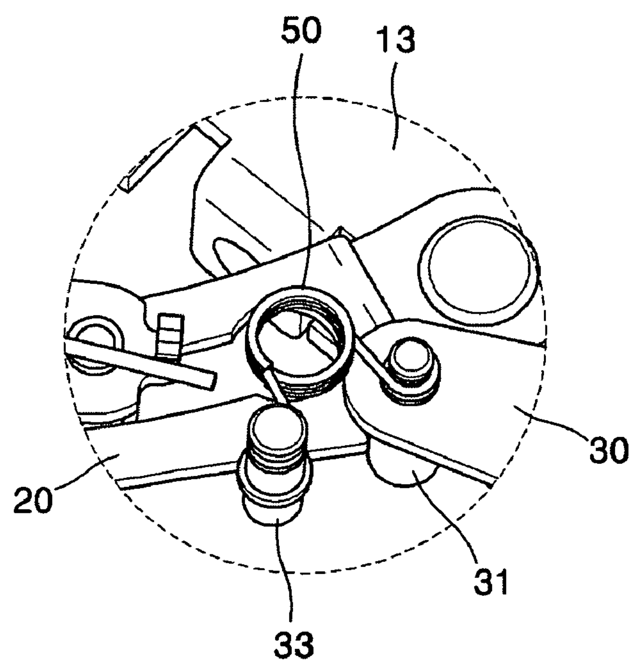
FIG. 8 is an enlarged view of a portion VIII of FIG. 6.

FIGS. 5 and 6 are perspective views of the strobe pop-up device when the strobe pop-up device is in the bounce position. FIG. 7 is an enlarged view of a portion VII of FIG. 5, and FIG. 8 is an enlarged view of a portion VIII of FIG. 6.

Referring to FIGS. 5 and 6, the strobe pop-up device includes the strobe assembly 10, the elastic element 12, and a unit for maintaining the strobe assembly 10 in the bounce position. The elastic element may be a pop-up spring in the form of a coil spring as illustrated in FIG. 5. The unit for maintaining strobe assembly 10 in the bounce position may include the guide links 20 and the bounce lock lever 30.

In addition, the strobe pop-up device may further include the strobe locking unit 40, which will be described in more detail with reference to FIGS. 11 through 13.

The strobe assembly 10 includes the strobe 15, which provides light when photographing in a dark place, and the strobe connecting link 13, which is disposed adjacent to the strobe 15, for moving the strobe 15 to a desired location. The strobe 15 and the strobe connecting link 13 are not directly connected to each other, but both are accommodated inside the strobe case 70 and operate as a single body, as described above.

The strobe assembly 10, the guide links 20, the bounce lock lever 30, and the strobe locking unit 40 interact with one another to fix and maintain the strobe 15 in the closed, bounce, or pop-up position.

In the bounce position illustrated in FIGS. 5 and 6, the strobe assembly 10 is maintained in an inclined position at a predetermined angle by the bounce lock pin 31 of the bounce lock lever 30, which is locked into the bounce lock pin groove 25 formed on one side of the guide link 20 (see FIG. 7). Here, the bounce lock spring 50, one end of which is fixed to an end of the bounce lock pin 31 and the other end of which is fixed to the spring fixing protrusion 33 of the first shoe base 77, pushes the bounce lock pin 31 towards the bounce lock pin groove 25, thereby maintaining the strobe assembly 10 in the bounce position (see FIG. 8).

The guide slots 23 are formed in the guide links 20. The strobe guide levers 22 are connected to the guide links 20 via the strobe link pins 24, which are inserted into the guide slots 23, so that the strobe guide levers 22 can move along the guide slots 23.

The strobe guide levers 22 include bent portions 22*a* on their rear ends, and grooves 22*b* on their front ends. Through-holes 22*c* through which the strobe link pins 24 are coupled, and pin holes 22*d* for fixing the guide springs 60 are formed in the strobe guide levers 22 (see FIG. 4).

The bent portions 22*a* at the rear ends of the strobe guide levers 22 are fixed to the first shoe base 77 by the screws 81. The strobe link pins 24 are connected to the strobe guide levers 22 through the through-holes 22*c* such that they can slide along the guide slots 23.

The guide springs 60 are coupled to the strobe guide levers 22 by pins 27 that pass through the pin holes 22*d*. The strobe guide levers 22 are biased upward by the guide springs 60, which each has an end placed on one of the hooking grooves 22*b*. Thus, when the bounce lock pin 31 is locked into the bounce lock pin groove 25 of the guide link 20 in the bounce position, the force by the guide springs 60 prevents the strobe guide lever 22 from sliding down along the guide slot 23 and releasing the bounce lock pin 31 from the bounce lock pin groove 25.

The bounce lock lever 30 is rotatably coupled by the strobe connecting link 13 and the bushings 76. The pop-up springs 12 are located at connecting points at which the bounce lock lever 30, the strobe connecting link 13, and the bushes 76 are connected, and biases the strobe connecting link 13 away from the bounce lock lever and the main body 102, that is, toward the pop-up position about the bushings.

The strobe locking unit 40 is supported by the first shoe base 77 and the second shoe base 78. Operation of the strobe locking unit 40 will be described later in more detail with reference to FIGS. 11 through 13.

By pressing the strobe assembly 10 about 45° and then releasing the strobe assembly 10 when it is in the pop-up position, the bounce lock pin 31 locks into the bounce lock pin groove 25 formed in the guide link 20. Consequently, the guide link 20 and the bounce lock lever 30 are stopped at a predetermined angle and the strobe assembly 10 is fixed in the bounce position.

Figure 9:
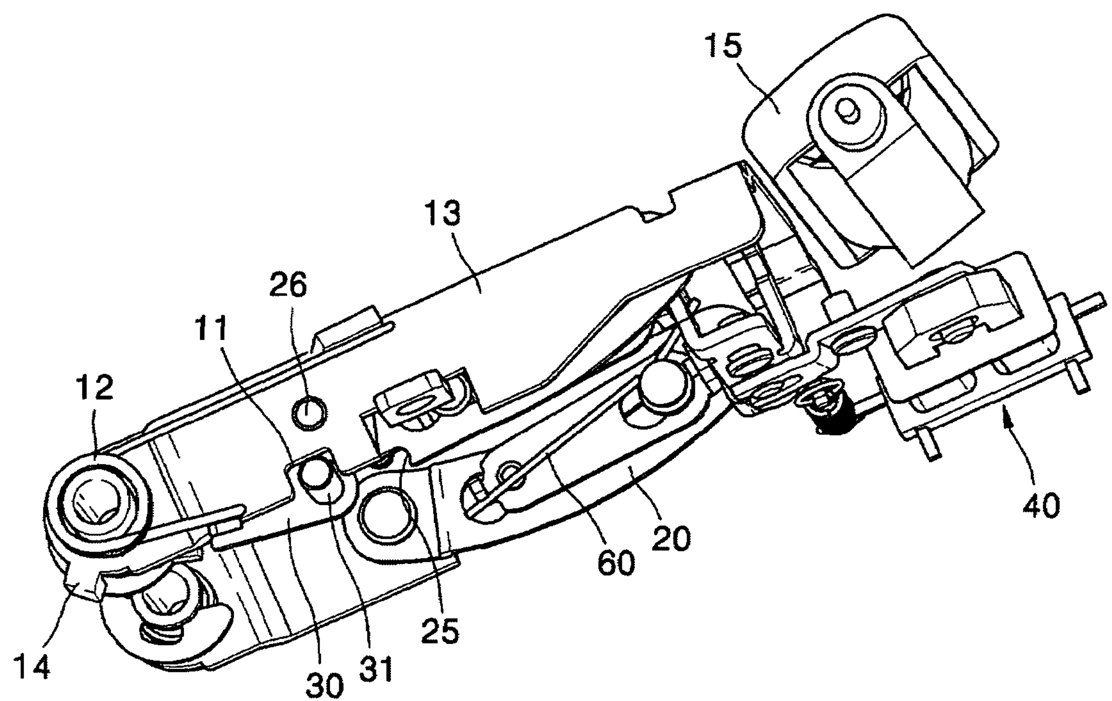
FIGS. 9 and 10 are perspective views of the strobe pop-up device of the invention in a closed position.
Figure 10:
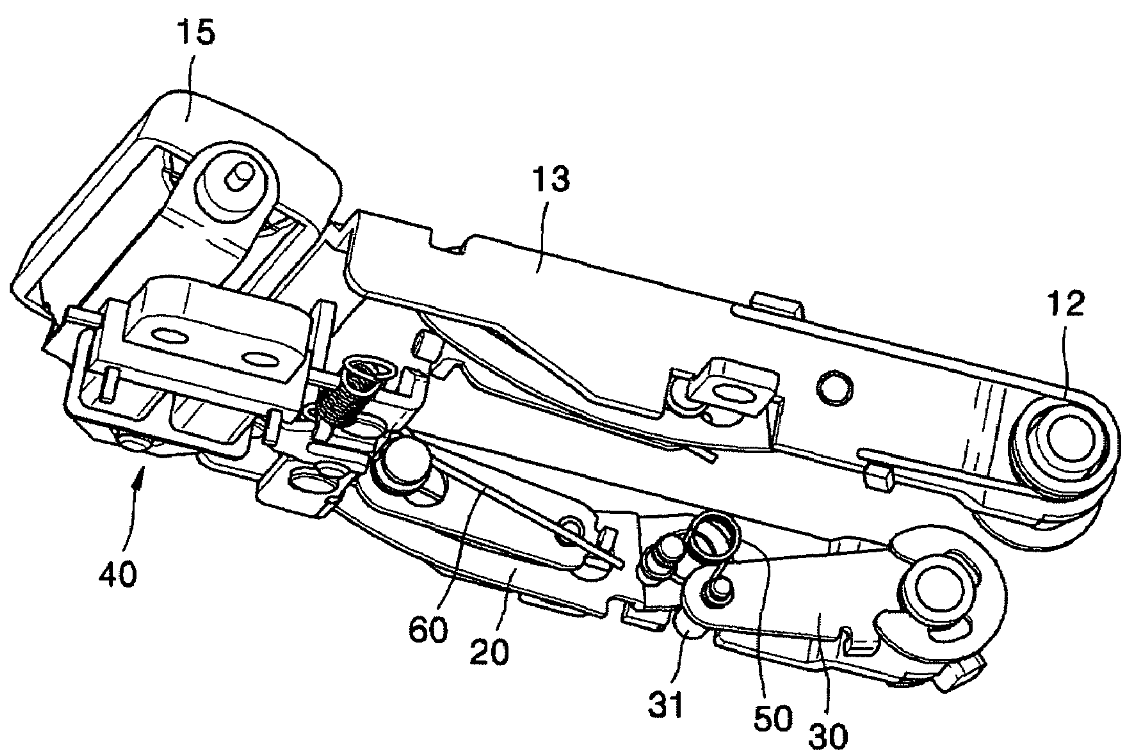

FIGS. 9 and 10 are perspective views of the strobe pop-up device in the closed position.

When the strobe assembly 10 is pressed completely down in the direction indicated by arrows shown in FIGS. 5 and 6 while in the bounce position illustrated in FIGS. 5 and 6, the strobe assembly 10 moves toward to the closed position illustrated in FIGS. 9 and 10.

When the strobe assembly 10 is pressed downwards, a bounce-lock-pin release groove 11 presses the bounce lock pin 31, and the bounce lock lever 30 and the guide link 20 are maintained in an almost straight line by the bounce lock spring 50.

Here, the elastic force of the bounce lock spring 50 is applied downwards, thereby biasing the bounce lock lever 30 and the guide link 20 toward a release position. The strobe assembly 10 is maintained in such a closed position, and when the strobe assembly 10 is popped up, the bounce lock pin 31 is no longer inserted in the bounce lock pin groove 25 of the guide link 20.

Figure 11:
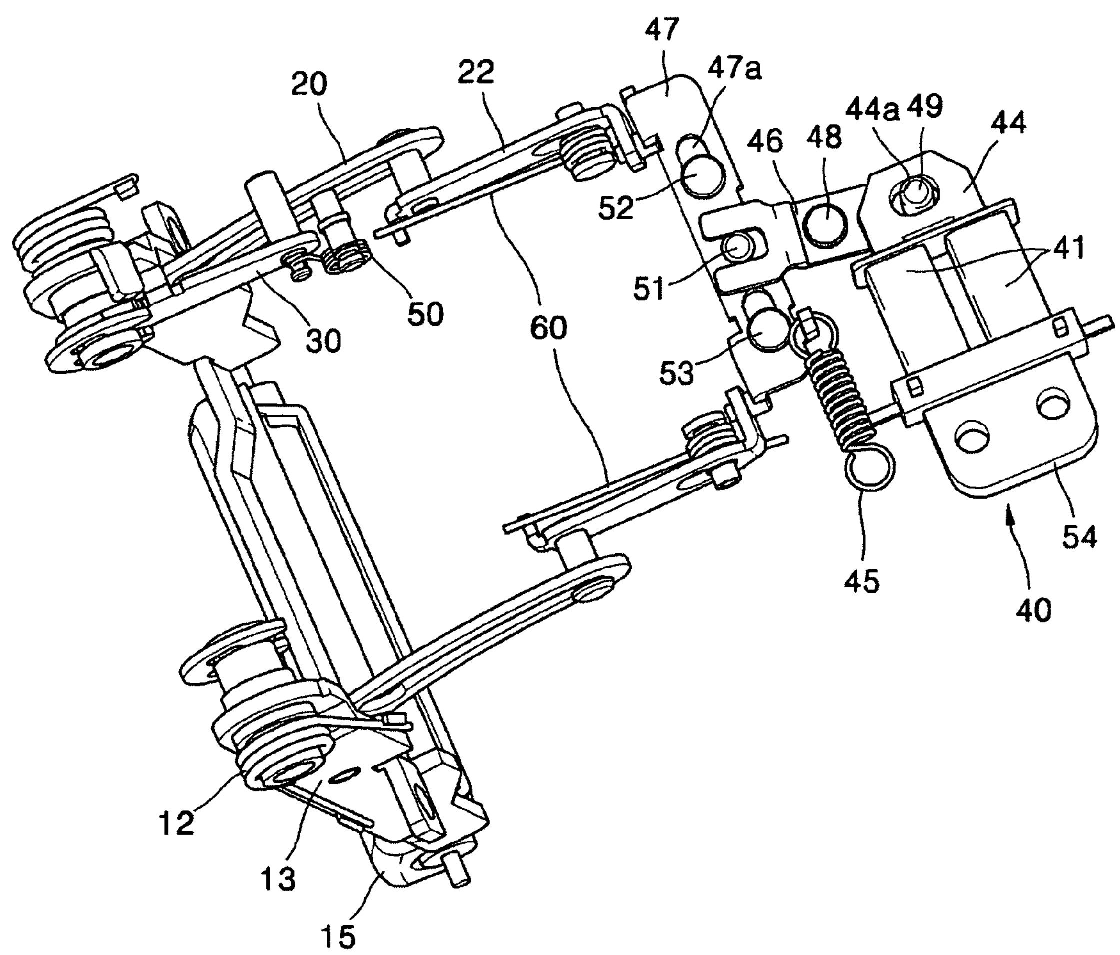
FIGS. 11 through 13 are perspective views of the strobe pop-up device of the invention in the pop-up position.
Figure 12:
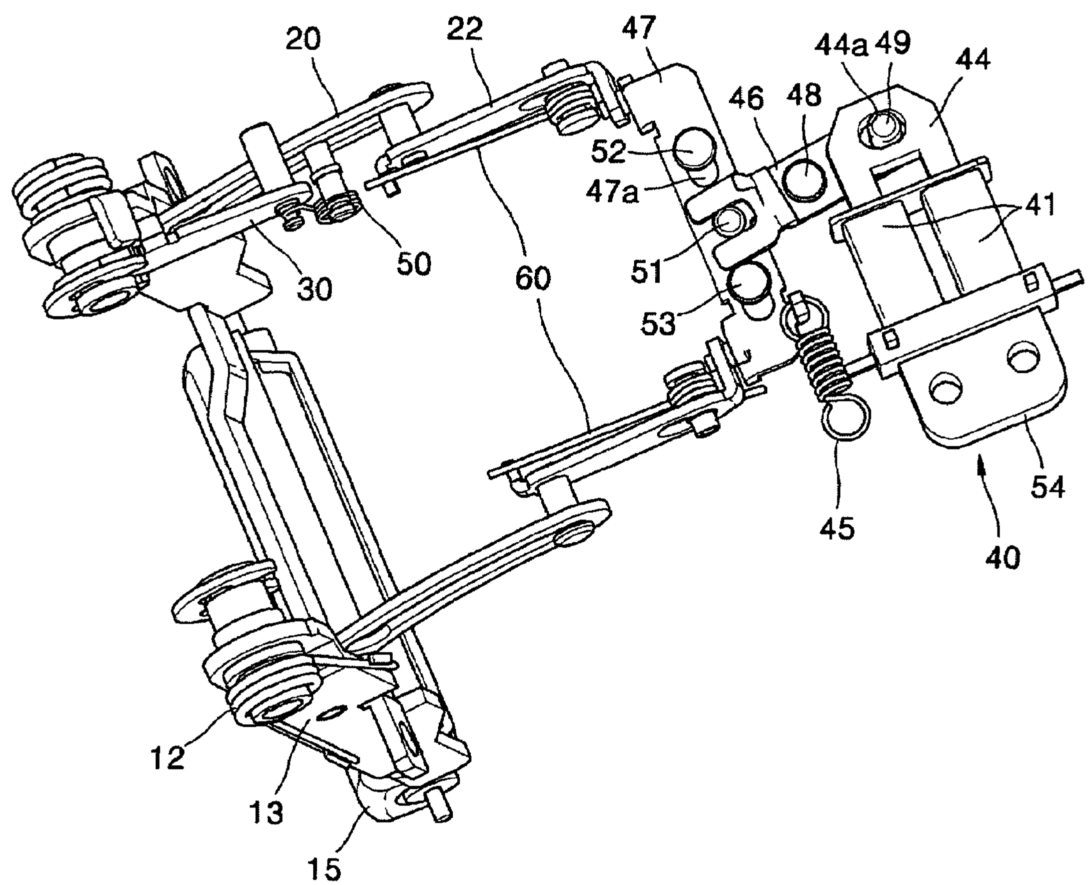
Figure 13:
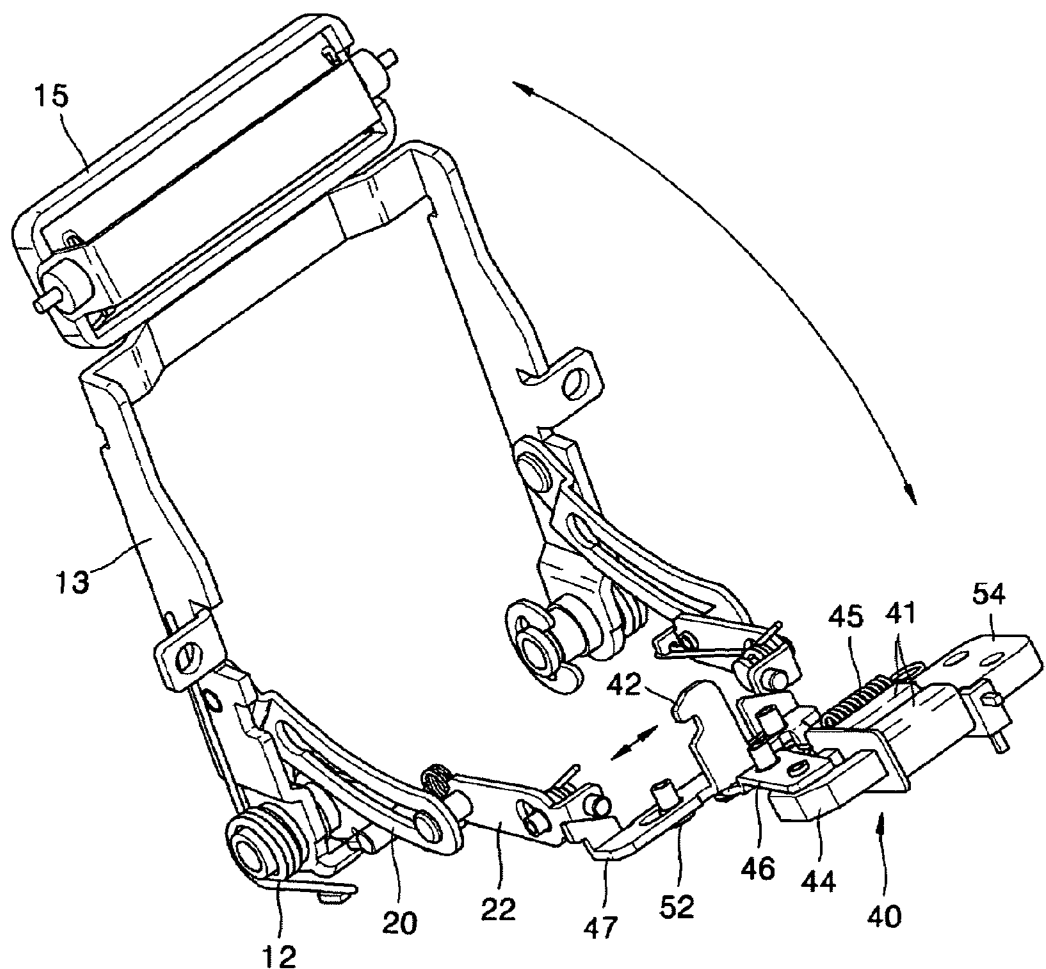

FIGS. 11 through 13 are perspective views of the strobe pop-up device in the pop-up position which illustrate the operations of the strobe locking unit 40.

The strobe locking unit 40 releases the strobe assembly 10 when a signal indicating low luminance is output from a light sensor (not shown) or a user operates the operating buttons disposed on the outer surface of the camera. The pop-up position of the strobe pop-up device is achieved by going through processes illustrated in FIGS. 11 through 13.

The strobe locking unit 40 includes the solenoid coil 41, the hook 42, a movable portion 44, the strobe lock lever spring 45, and the hook connecting link 46.

The solenoid coil 41 is an element that can produce a magnetic field as current flows through it. One side of the solenoid coil 41 is fixed to a fixed portion 54, and the other side of the solenoid coil 41 is inserted into the movable portion 44, which is a permanent magnet. The fixed portion 54 is fixed to the second shoe base 78, and the movable portion 44 is connected to the hook connecting link 46 and a pin joint 49. A through-hole 44*a* having a predetermined length is formed in the movable portion 44 so that the pin joint 49, when inserted into the through-hole 44*a*, can move along the length of the through-hole 44*a* with a predetermined clearance.

The hook connecting link 46 is coupled to a protrusion pin 51 on a movable plate 47, on which the hook 42 is formed as a single body, and is rotatably fixed to the first and second shoe bases 77 and 78 via a hinge 48. Through-holes 47*a* having predetermined lengths are formed in the movable plate 47. The movable plate 47 is supported by the first shoe base 77 via pin joints 52 and 52 that are inserted through the through-holes 47*a*. The movable plate 47 has a clearance corresponding to the lengths of the through-holes 47*a* and can slide along the through-holes 47*a* according to the operation of the hook connecting link 46. The movable plate 47 is connected to the first shoe base 77 or the second shoe base 78 so that the elastic force of the strobe lock lever spring 45 acts in a single direction.

In the present state, the strobe locking unit 40 can move to the closed position illustrated in FIG. 11, or the released position illustrated in FIG. 12. As illustrated in FIG. 11, when current flows through the solenoid coil 41 in the closed position, a magnetic field generated by the solenoid coil 41 creates a repulsive force towards the movable portion 44 made of a magnet. Thus, the movable portion 44 is separated a predetermined distance from the solenoid coil 41. Accordingly, the hook connecting link 46 rotatably fixed to the hinge 48 pushes a protrusion pin 51 on the movable plate 47 in response to the repulsive force between the solenoid coil 41 and the movable portion 44. The movable plate 47 moves as illustrated in FIG. 12 in response to the force of the protrusion pin 51 being pushed and the elastic force of the strobe lock lever spring 45. At this time, the hook 42, which is formed as a single body with the movable plate 47, also moves. The hook 42 fixes the strobe back cover 72 until the movable plate 47 moves, in which case, the hook 42 releases the strobe back cover 71, and thus the entire strobe assembly 10 moves to the pop-up position from the closed position. That is, when the movable portion 44 is separated from the hook connecting link 46, the hook 42 is removed from the through-hole 72*a*. The strobe assembly 10 moves to the pop-up position due to the elastic force of the pop-up springs 12 where the strobe assembly 10 and the bounce lock lever 30 are joined.

In the closed position, the hook 42 is maintained to be coupled to the through-hole 72*a* formed in the strobe back cover 72 by the elastic force of the strobe lock lever spring 45. Thus, the strobe assembly 10 is maintained in the closed position.

When the camera is configured to automatically move to the pop-up position by receiving a signal from the light sensor, a controller (not shown) can be installed in the camera. The controller has the function of comparing external luminance and a pre-set luminance, and controlling the amount of current flowing to the solenoid coil 41 if the external luminance is less than the pre-set luminance.

The strobe assembly 10 sets up the return to the bounce position while moving to the pop-up position. That is, when the strobe assembly 10 is popped up a certain amount, a release protrusion portion 14 of the strobe assembly 10 (see FIG. 5) pushes a bounce lock lever 32 (see FIG. 5) up. The remaining operations of the strobe assembly 10 are the opposite when moving the strobe assembly 10 to the bounce position.

When the strobe assembly 10 is pressed about 45° in the direction indicated by an arrow in FIG. 13 while the strobe assembly 10 is in the pop-up position illustrated in FIG. 13, and then released, the strobe assembly 10 is fixed at a predetermined angle in the bounce position as described above.

That is, the bounce lock lever 30 is biased by the bounce lock spring 50, and the bounce lock pin 31 coupled to the bounce lock lever 30 sets up the return to the bounce position during the process when the release protrusion portion 14 pushes the bounce lock lever 32 up toward the pop-up position.

As described above, a strobe pop-up device according to the present invention can easily move a strobe to a pop-up position, a bounce position, or a closed position without using a gear train or a motor as in the conventional strobe pop-up devices.

In addition, when such a strobe pop-up device of the invention is adopted in a camera, the number of components of the camera is greatly reduced, thereby decreasing the overall weight and size of the camera. Furthermore, manufacturing costs of the camera are reduced since the number of components of the camera is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A strobe device of a camera, comprising:

a strobe assembly including:

a strobe unit; and a strobe connecting link, a lower portion of which is rotatably supported by a main body of the camera for moving the strobe assembly to a closed position, a pop-up position, and a bounce position;

an elastic element coupled with the strobe connecting link and biasing the strobe assembly toward a direction that the strobe assembly stands upright; and a bounce-position maintaining element for maintaining the strobe assembly to be in an inclined position at a predetermined angle between the closed position and the pop-up position;

wherein the lower portion of the strobe connecting link is rotatably supported by the main body of the camera;

wherein the strobe assembly accommodates the strobe unit, and further comprises a strobe case that is connected to the strobe connecting link;

wherein the strobe device further includes a shoe holder for mounting a separate lighting element thereto, and the strobe assembly and the strobe case are configured to avoid interference with the shoe holder for mounting the separate lighting element thereto.

2. The strobe device of claim 1, wherein the lower portion of the strobe connecting link is rotatably supported by the main body of the camera at a location closer to a subject to be photographed than the strobe unit when the strobe assembly is in the closed position.

3. The strobe device of claim 2, wherein the elastic element is a pop-up spring in a form of a coil spring that is disposed at a location where the strobe connecting link is coupled to the main body of the camera, one end of the pop-up spring is supported by the strobe case, and the other end of the pop-up spring is supported by the main body of the camera.

4. The strobe device of claim 2, wherein the strobe assembly and the strobe case include an opening for avoiding interference with the shoe holder.

5. The strobe device of claim 1, further comprising a hook that fixes the strobe assembly in the closed position.

6. The strobe device of claim 5, further comprising a strobe locking unit that maintains the strobe assembly in the closed position by controlling the location of the hook or releases the strobe assembly from the closed position in response to the elastic force of the pop-up spring.

7. The strobe device of claim 6, wherein the strobe locking unit comprises:

a solenoid coil, one side of which is fixed to the main body of the camera and the other side is a movable portion that moves in response to a magnetic field produced when current flows through the solenoid coil;

a hook connecting link that is connected to the movable portion via a pin joint;

a movable plate that moves the hook according to the movement of an end of the hook connecting link; and a strobe lock lever spring that is connected to the movable plate, and biases the hook in the closed position.

8. The strobe device of claim 7, wherein the movable plate has a through-hole having a predetermined length formed thereon, and the movable plate is supported by a pin joint, which passes through the through-hole, the movable plate being movable with a predetermined clearance from the main body of the camera.

9. The strobe device of claim 7, wherein the movable portion has a through-hole having a predetermined length formed thereon, and the hook connecting link is supported by a pin joint, which passes through the through-hole, to be able to move with a predetermined clearance.

10. The strobe device of claim 1, wherein the bounce-position maintaining element comprises:

a guide link which is rotatably connected to the strobe connecting link; and a bounce lock lever of which one end is rotatably connected to an end of the strobe connecting link and the other end is connected to the guide link via a bounce lock spring, which applies an elastic force towards the guide link and is coupled to a bounce lock pin.

11. The strobe device of claim 10, wherein a guide slot is formed in the guide link, and the strobe device further comprises: a strobe guide lever, one side of which is fixed to the main body of the camera and can move along the guide slot.

12. The strobe device of claim 11, further comprising a guide spring which applies an elastic force upwards to maintain the bounce lock pin in the bounce lock pin groove even when the strobe guide lever moves toward the outside along the guide slot.

13. A camera comprising:

a main body having a barrel coupled with the main body;

a strobe assembly including:

a strobe unit; and a strobe connecting link which has its lower portion rotatably supported by the main body for moving the strobe assembly to a closed position, a pop-up position, and a bounce position;

an elastic element coupled with the strobe connecting link and biasing the strobe assembly toward a direction that the strobe assembly stands upright; and a bounce-position maintaining element for maintaining the strobe assembly to be in an inclined position at a predetermined angle between the closed position and the pop-up position;

wherein the lower portion of the strobe connecting link is rotatably supported by the main body of the camera;

wherein the strobe assembly accommodates the strobe unit, and further comprises a strobe case that is connected to the strobe connecting link, and the elastic element is disposed at a location where the strobe connecting link is connected to the main body of the camera;

wherein the strobe assembly further includes a shoe holder for mounting a separate lighting element thereto, and the strobe assembly and the strobe case include an opening for avoiding interference with the shoe holder for mounting the separate lighting element thereto.

14. The camera of claim 13, wherein the lower portion of the strobe connecting link is rotatably supported by the main body of the camera at a location closer to a subject to be photographed than the strobe unit when the strobe assembly is in the closed position.

15. The camera of claim 14, wherein the elastic element is a pop-up spring in a form of a coil spring, one end of the pop-up spring is supported by the strobe case, and the other end of the pop-up spring is supported by the main body of the camera.

16. The camera of claim 13, wherein the bounce-position maintaining element comprises:

a guide link which is rotatably connected to the strobe connecting link; and a bounce lock lever of which one end is rotatably connected to an end of the strobe connecting link and the other end is connected to the guide link via a bounce lock spring, which applies an elastic force towards the guide link and is coupled to a bounce lock pin.

17. The camera of claim 16, wherein a guide slot is formed in the guide link, and the strobe device further comprises: a strobe guide lever, one side of which is fixed to the main body of the camera and can move along the guide slot.

18. The camera of claim 17, further comprising: a guide spring which applies an elastic force upwards to maintain the bounce lock pin in the bounce lock pin groove even when the strobe guide lever moves toward the outside along the guide slot.

* * * * *